United States Patent [19]

Inoue et al.

[11] Patent Number: 4,703,414
[45] Date of Patent: Oct. 27, 1987

[54] PROGRAMMABLE CONTROLLER

[75] Inventors: Tadashi Inoue, Ohyamazaki; Tosimi Matsuura, Tanabe, both of Japan

[73] Assignee: Omron Tateisi Electronics Co., Kyoto, Japan

[21] Appl. No.: 742,308

[22] Filed: Jun. 7, 1985

[30] Foreign Application Priority Data

Jun. 7, 1984 [JP] Japan ................................ 59-117253

[51] Int. Cl.⁴ ............................................ G06F 15/46
[52] U.S. Cl. ................................... 364/147; 364/900
[58] Field of Search ............................ 364/140–147, 364/900 MS File

[56] References Cited

U.S. PATENT DOCUMENTS 4,200,916  4/1980  Seipp ................................... 364/900
4,303,990  12/1981  Seipp ................................... 364/900
4,314,329  2/1982  Crewe et al. ........................ 364/900

Primary Examiner—Joseph Ruggiero
Attorney, Agent, or Firm—Stevens, Davis, Miller & Mosher

[57] ABSTRACT

This programmable controller includes: a programmable console with a keyboard; a user program memory; a retrieval means for retrieving the contents of the user program memory in response to the operation of a certain key provided on the keyboard; a first command extracting means for extracting a series of user commands relating to whether execution conditions for an interlock command are met or not when the interlock command is detected by the action of the retrieval means; a first memory means for storing the interlock command and a series of user commands; a second command extracting means for, during the time between the detection of the interlock command and the detection of a corresponding interlock clear command by the action of the retrieval means, extracting all the specific user commands from the group of user commands interposed between the interlock command and the interlock clear command; a second memory means for storing the specific user commands with their addresses; the interlock command and the series of the user commands stored in the first memory means being outputted to the outside in logical association; and an output processing means for outputting the specific user commands and their addresses stored in the second memory means to the outside.

1 Claim, 9 Drawing Figures

FIG. 7(B)

| PROGRAM ADDRESS | COMMAND CODE | OPERAND (I/O SIGNAL) | REMARKS |
|---|---|---|---|
| ⌇ | ⌇ | ⌇ | ⌇ |
| 95 | LD | 50 | |
| 96 | OUT | 21 | |
| 97 | LD | 51 | |
| 98 | OR | 52 | |
| 99 | AND | 53 | |
| 100 | IL | | |
| 101 | LD | 54 | |
| 102 | LD | 55 | |
| 103 | OR | 56 | |
| 104 | AND LD | | |
| 106 | OUT | 22 | |
| 107 | LD NOT | 57 | |
| 108 | OUT | 23 | |
| 109 | LD | 58 | |
| 110 | AND | 59 | |
| 111 | MOV | 3,4 | |
| 112 | ILC | | |
| 113 | LD | 60 | |
| 114 | OR | 61 | |
| 115 | OUT | 25 | |
| ⌇ | ⌇ | ⌇ | ⌇ |

Rows 101–111 bracketed as A

F I G. 8

| RELAY NUMBER | —O⊣ ADDRESS | ⊣⊢ ADDRESS | ⊣⊬ ADDRESS | CHANNEL ADDRESS |
|---|---|---|---|---|
| ≀ | ≀ | ≀ | ≀ | ≀ |
| 50 |  | 95 |  |  |
| 51 |  | 97 |  |  |
| 52 |  | 98 |  |  |
| 53 |  | 99 |  |  |
| 54 |  | 101 |  |  |
| 55 |  | 102 |  |  |
| 56 | 106 | 103 |  |  |
| 57 | 108 |  | 107 |  |
| 58 |  | 109 |  |  |
| 59 |  | 110 |  |  |
| ≀ | ≀ | ≀ | ≀ | ≀ |

PROGRAMMABLE CONTROLLER

BACKGROUND OF THE INVENTION

1. Technical Field

This invention relates to a programmable controller, and in particular relates to a programmable controller which simplifies debugging of a user program which includes an interlock command.

2. Background Of the Invention

As is per se known, programmable controllers may be classified into those of the relay ladder diagram type and those of the flow chart type.

In such a programmable controller, an interlock command and an interlock clear command are defined as two possible forms that may be taken by the user commands, and there is provided an interlock processing function which prohibits the output of the group of execution commands interposed between the interlock command and the clear command, depending on whether the conditions for the interlock are satisfied or not. If more details are required about this per se known function, reference should be made to the various catalogs published by the assignee of the Japanese patent application Ser. No. 59-117253 (1984) the priority of which is being claimed in the present patent application, and in particular to page 10 of "Programmable Controller SYSMAC" published in August 1983, and to page 50 of "Programmable Controller SYSMAC M1R", published in January 1983.

An example of a program including such an interlock command is shown in FIG. 7(A) of the accompanying drawings in terms of a relay ladder diagram to which the program serves as a source program, while FIG. 7(B) is a program listing showing the same program in the form of an object program written in mnemonics, and FIG. 8 is a cross reference table of said program.

In these figures, "IL" refers to an interlock command, while "ILC" refers to an interlock clear command. In this program, the IL command is set up in address 100, while the ILC command is set up in address 112, and the program A interposed between these commands is intended as an object for control for the interlock command.

Whether the interlock condition of the IL command in address 100 is satisfied or not is determined by whether, in FIG. 7(A), the logical OR of the contacts 51 and 53 ANDed with the contact 53 is unity or zero, In other words, when this logical result is unity, the interlock condition is not satisfied, and the OUT command and the MOVE commands in the program A are executed in the normal fashion. However, when this logical product is zero, the interlock condition is satisfied, and the program execution operation is switched over so as to prohibit the outputs included in the program A and to turn OFF all of them.

In such a programmable controller, there is provided a monitor function intended for program debugging on the part of the user.

Such a monitor function may be achieved in a number of ways, but in any case when a special user command which is to be monitored is determined and the user command executed, the monitor function transmits the control data such as the logical state of the I/O signal used and the user command, the numerical value data of the timer/counter if the user command is a timer/counter command, the logical state of the power flow register resulting from the logical computation executed by the command, and so on, relating to the execution of the user command, and displays them. As an example, when OUT (21) is OFF and its cause is to be investigated making use of such a monitor function, the user knows the logical state of the contact 50 affects the input condition of the OUT 21 by referring to the ladder diagram and the program listing shown in FIGS. 7(A) and 7(B) and to the cross reference list shown in FIG. 8, and makes entries into the program console using the address 95 as an object for monitoring.

Then, upon execution of the LD (50) command, the logical state of the contact 50 and the logical state of the power flow register upon execution of the command are transmitted to the program console as monitor data, and this is displayed.

By seeing this display, the user knows the reason why the OUT (21) is OFF, and can make appropriate corrections.

In monitoring output, corresponding commands such as OUT commands and MOV commands in the program A interposed by an interlock command, as shown in FIGS. 7(A) and 7(B), when the interlock condition is not satisfied, there is not problem, but when the interlock condition is satisfied and all the output signals of for instance the OUT commands in the program A are all OFF, then the following problem arises.

When an output inhibition by interlock is in effect, for instance even when the contact 57 is OFF or zero, the output 23 is OFF or zero. In such a case, in order to monitor the OUT (23) command and to find out the cause of the output signal 23 being OFF or zero, the monitor object addresses are decremented, and the LD NOT (57) command of the address 107 is monitored. At this time, if the logical state of the power flow register is zero upon execution of the LD NOT (57) command, one can see that the logical conflict between the LD NOT (57) command and the OUT (23) command is due to the interlock command.

Because it is not possible to determine from the monitor for what cause the output inhibition by the interlock has gone into effect, the cause can be known only after finding the IL command of the address 100 by sequentially decrementing the program address and monitoring the END (53) command of the address 99, the OR (52) command of the address 98, and the LD (51) command of the address 97, by decrementing the monitor object addresses.

Thus, it requires a considerable time interval for finding the cause of such a problem in debugging a user program including an interlock command, if it is performed only with a conventional monitor function. Particularly when the length of the user program interposed between interlock commands is long, or when a plurality of interlock commands are being used, considerable time is required for program debugging, and some improvement has been strongly desired.

SUMMARY OF THE INVENTION

Accordingly, it is the primary object of this invention to provide a programmable controller which can reduce the time required for debugging a user program including an interlock command.

According to the most general aspect of the present invention, these and other objects are accomplished by a programmable controller, comprising: a programmable console comprising a keyboard comprising a special key; a user program memory; a retrieval means for retrieving the contents of said user program memory in response to the operation of said special key provided in said keyboard; a first command extracting means for extracting a series of user commands relating to whether execution conditions for an interlock command are met or not when the interlock command is detected by the action of said retrieval means; a first memory means for storing the interlock command and a series of user commands; a second command extracting means for, during the time between the detection of the interlock command and the detection of a corresponding interlock clear command by the action of said retrieval means, extracting all the specific user commands from the group of user commands interposed between the interlock command and the interlock clear command; a second memory means for storing the specific user commands with their addresses; the interlock command and the series of the user commands stored in said first memory means being outputted to the outside in logical relationship; and an output processing means for outputting the specific user commands and their addresses stored in said second memory means to the outside.

According to such a structure, through operation of said certain key on the keyboard of the program console, specific commands such as a series of commands relating to whether an interlock condition is satisfied or not and specific commands such as the output commands and output corresponding commands (MOV command, CPM command, and so on) among the user commands interposed between the interlock command and the interlock clear command become available for outputting to the outside. As a result, considerable time is saved as compared to the case in which the conventional monitor function is used in debugging.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claim. In the drawings, like parts and spaces and so on are denoted by like reference symbols in the various figures thereof; in the description, spatial terms are to be everywhere understood in terms of the relevant figure; and:

FIGS. 7(A) and 7(B) are illustrations showing an exemplary user program including an interlock command in the form of a ladder diagram and in the form of mnemonics, respectively; and FIG. 8 is a cross reference list for this program which is used in debugging.

DESCRIPTION OF THE PREFERRED EMBODIMENTS

Figure 1:
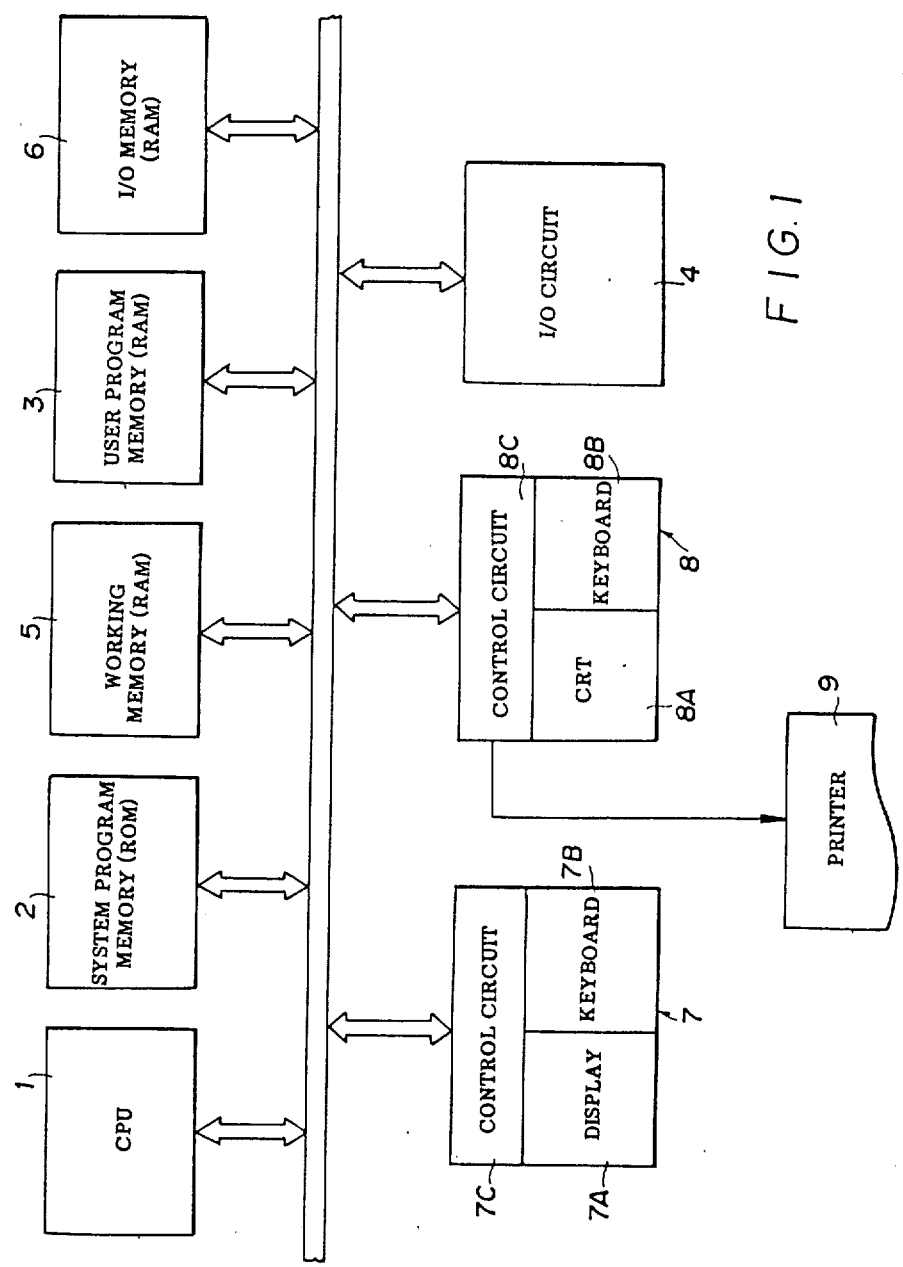
FIG. 1 is a basic block diagrammatical structural view showing the constitution of a programmable controller according to either of the preferred embodiments of this invention.

The present invention will now be described with reference to the preferred embodiments thereof, and with reference to the appended drawings. FIG. 1 is a block diagram showing the basic structure of the programmable controller according to either of the two preferred embodiments of this invention.

Figure 7A:
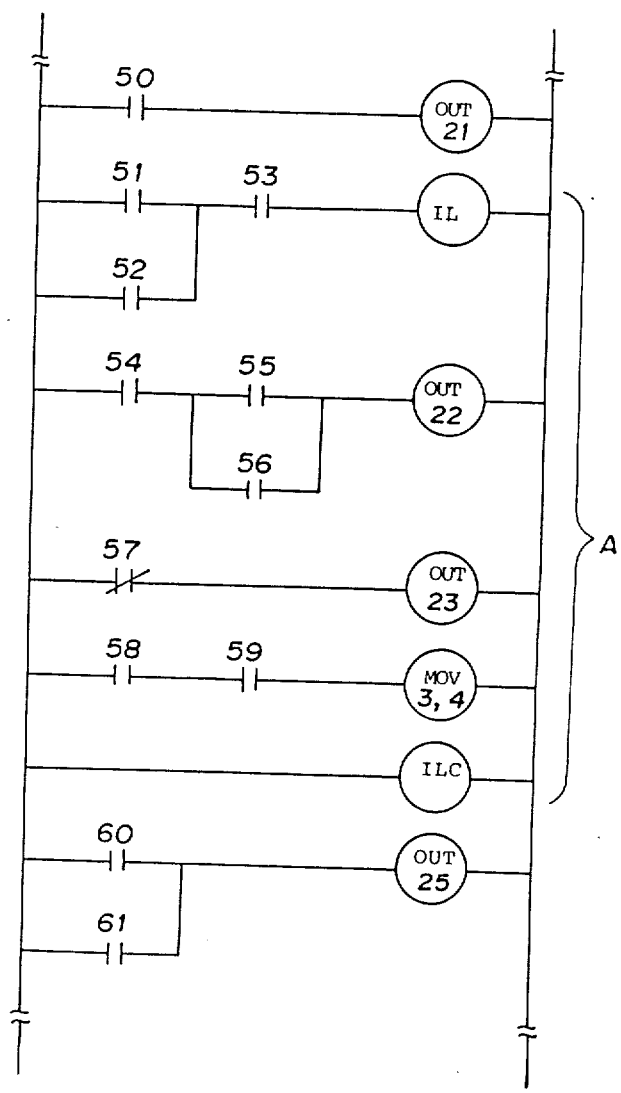

This programmable controller, based upon a central processing unit or CPU 1, comprises a system program memory 2 for storing a system program defining the control actions of the CPU 1, a user program memory for storing a user program such as the one shown in FIG. 7(A) in the form of a relay ladder type representation, an I/O circuit 4 for exchanging signals with external I/O equipment, a working memory (RAM) 5 for temporarily storing various variable data when the CPU 1 operates according to the system program, and including a memory pointer MP for designating an address of the user program memory 3, an I/O memory 6 serving as a buffer memory for input and output data corresponding to the I/O circuit 4, program consoles 7 and 8 for working this invention in addition to the known system service processing such as a monitoring process and so on, and a printer 9.

The program console 7 is a simple console, and comprises a display 7A, a keyboard 7B, and a control circuit 7C connecting said display 7A and said keyboard 7B to the CPU 1. The console 8 is a graphic type console, and comprises a display device (CRT) 8A, a keyboard 8B similar to the keyboard 7B, and a control circuit 8C connecting said display device 8A and said keyboard 8B to the CPU 1.

The keyboards 7B and 8B of the respective program consoles 7 and 8 are not used at the same time, but they are used for writing an arbitrary user program into the user program memory 3 and giving monitor instructions during program execution, and in response to this the monitor data supplied from the CPU 1 is displayed on the display 7A and according to the operation of certain or special keys a certain special display is made on the CRT 8A which is additionally printed out on the printer 9.

Figure 2:
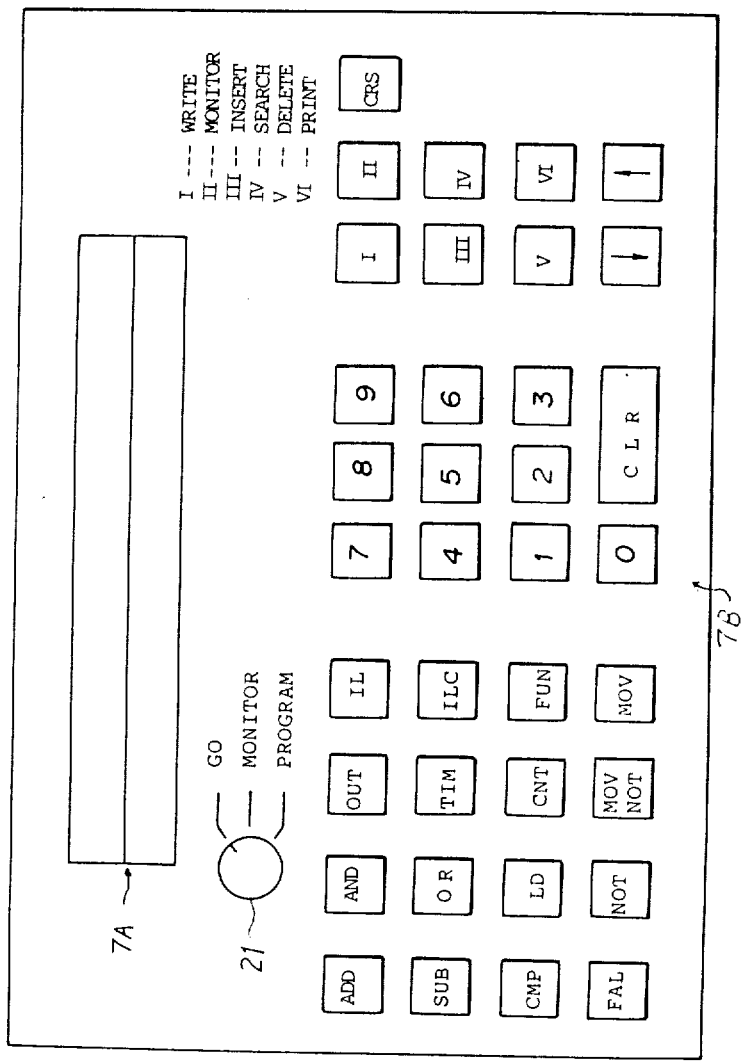
FIG. 2 shows the external appearance of an operation panel of a simple program console incorporated in either of said preferred embodiments of the present invention.

FIG. 2 shows a particular exemplary external appearance for the operation panel of the simple program console 7, for either of the preferred embodiments of the present invention. As shown in this figure, this operation panel is provided with the display 7A, the keyboard 7B, and with a mode switchover switch 21.

The display 7A in the shown example is an alphanumeric display with two lines spaced apart vertically.

The keyboard 7B comprises command code keys corresponding to various command codes such as the IL command, the ILC command, the MOV command, and so on, a ten-key pad for inputting program addresses and I/O numbers, a CRS key and a PRINT key for working this invention, and various function keys for monitoring, retrieval, writing, and so on.

Figure 3:
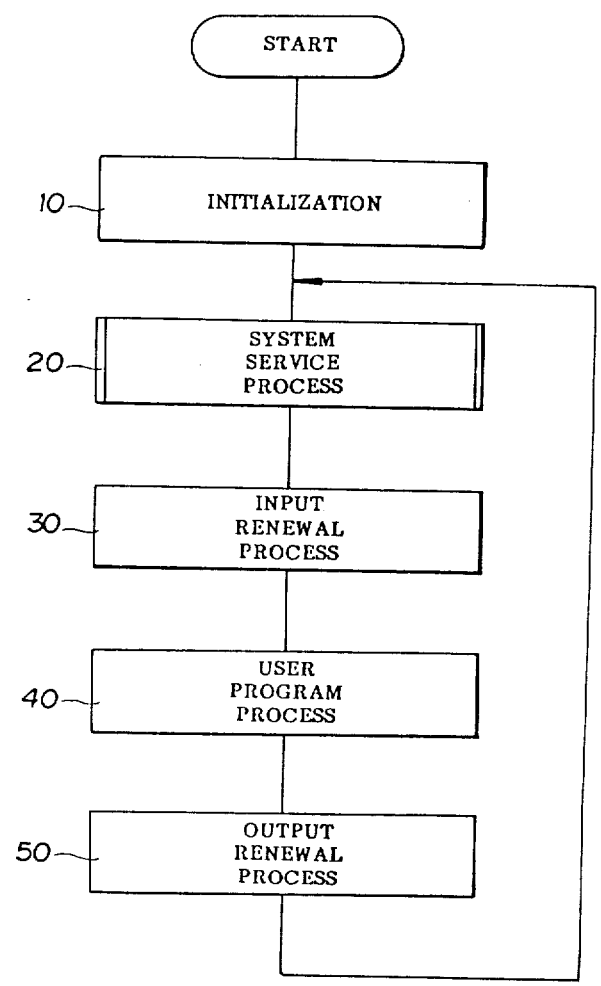
FIG. 3 is a flow chart showing the overall action of the programmable controller, in either of said preferred embodiments of the present invention.

FIG. 3 is a flow chart showing the outline of the action of the programmable controller, and relates to both of the preferred embodiments of the present invention.

As is per se known, in such a programmable controller, upon initialization of the timers and the counters in the first step 10, by execution of the system program in the CPU 1, the system service process in the step 20, the input renewal process in the step 30, the user program process in the step 40, and the output renewal process in the step 50 are performed in a repetitive and cyclic manner.

In the system service process in the step 20, in response to keyed input from the program console 7 or the program console 8, an appropriate system service process program stored in the system program memory 2 is read out at the same time as the address of the user program memory 3 corresponding to the key operation is set up in the memory pointer MP provided in the RAM, and based upon this various actions (system services) such as displaying command words and addresses of the monitored objects on the display 7A, monitor processing, correction of the user program, and so on are performed.

Figure 4:
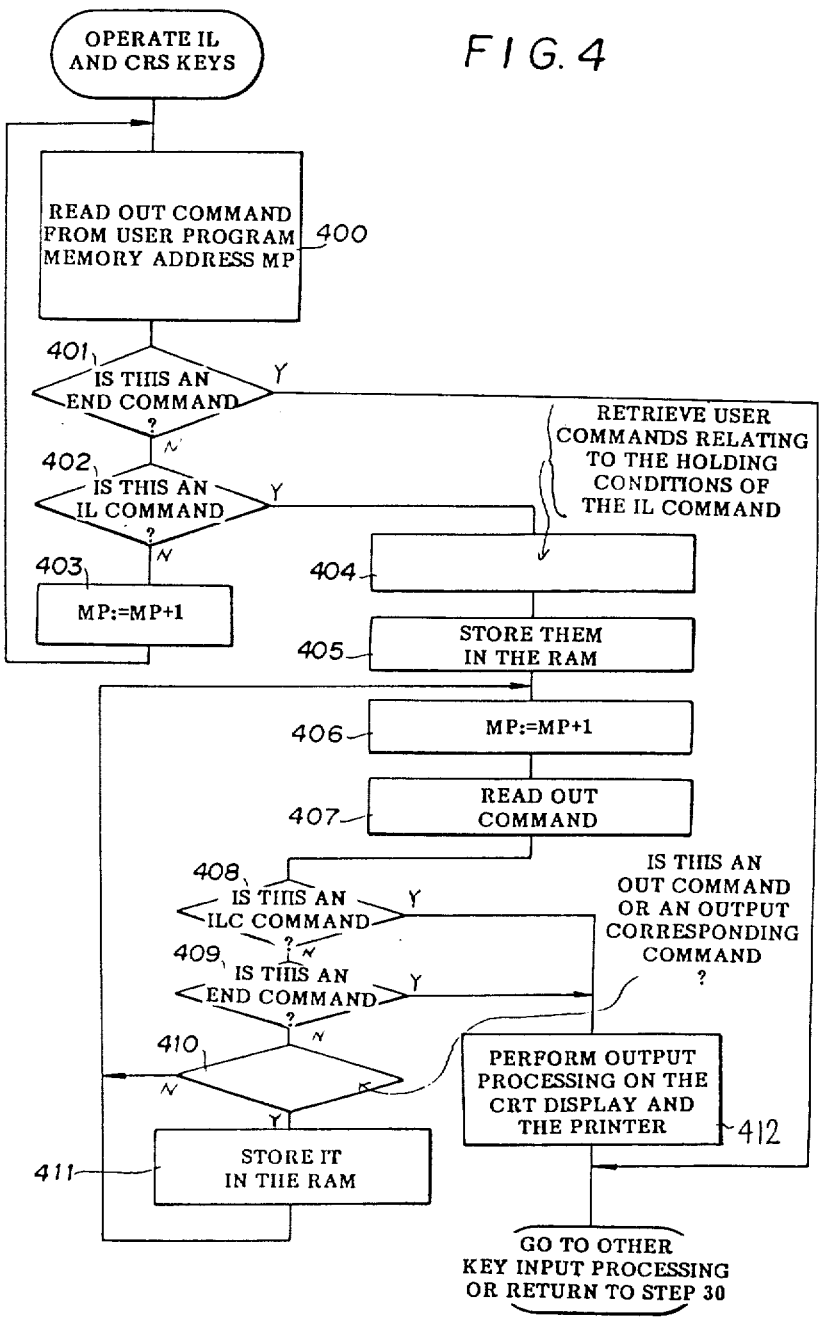
FIG. 4 is a flow chart showing a system service process incorporated in the operation of a first one of the preferred embodiments of the present invention.

Additionally, according to this invention, the system service processes flow charts of which are shown in FIGS. 4 and/or 5 are performed. These output, in response to the operation of the IL key, FUN key, CRS key, and PRINT key, a series of user commands relating to whether the condition for the IL command is met or not, and the OUT commands and the output corresponding commands, such as the MOV command, the CMP command, and so on, are located between the IL command and the ILC command on the CRT 8A at the same time as printing them out on the printer 9.

The action of the input renewal process of the step 30 consists of writing the input data given to the input port of the I/O circuit 4 into predetermined areas of the I/O memory 6 in one group.

The action of the user program process in the step 40 consists in sequentially reading out user commands from the user program memory 3, performing computation with reference to the I/O data stored in the I/O memory 6 according to these various user commands, and renewing the predetermined output data in the I/O memory 6 based upon the results of this previous processing.

The action of the output renewal process in the step 50 consists in sending the output data in a predetermined area of the I/O memory 6 to the output port of the I/O circuit 4 in one group.

Next, the system service processing routines of this invention will be described in the following, with reference to the flow chart of FIGS. 4 and 5.

The flow chart in FIG. 4 shows a processing routine for the case in which the IL key and the CLS keys are operated. This concept by itself constitutes the operation of the first preferred embodiment of the present invention.

In other system service processing, a program address is set up in the program counter MP, and in the step 400 of this routine, starting from the particular program address MP, a command is read out from said address MP of the the user program memory 3.

The command read out in the step 401 is then tested to determine whether it is an END command or not. If the result of this determination is YES, then the flow of control advances to other key input process or step 30; whereas, if the result of this determination is No, the flow of control advances to the step 402 and a determination is made as to whether this command is an IL command or not. If the result of this determination in the step 402 is NO, the memory pointer MP is advanced (step 403), and the flow of control returns back to the step 400.

Thus, by repeatedly executing the routine consisting of the steps from step 400 to step 403, an IL command is retrieved from the user program memory 3.

When an IL command is retrieved in the step 402, the flow of control advances to the step 404, and the user commands relating to the holding conditions of the IL command are retrieved. This is done as shown by reference to the example given in FIGS. 7(A) and 7(B). While decrementing the memory pointer MP, an OUT (21) command is retrieved from the user program memory 3, and, assuming that the intervening commands such as the LD (51) command, the OR (52) command, and the AND (53) command are the user commands relating to the holding condition of the IL command, while the memory pointer MP is being incremented, the LD (51) command, the OR (52) command, the AND (53) command, and the IL command are sequentially read out so that they may be stored in the RAM 5 in the next step 405.

Until the time an ILC command is detected in step 408 or an END command is detected in step 409, as the memory pointer MP is advanced (step 406), commands are sequentially read out from the user program memory (step 407) and OUT commands and output corresponding commands (MOV command, CMP command, and so on) are detected (step 410) to store them in the RAM 5 (step 411).

In terms of the example shown in FIGS. 7(A) and 7(B), the OUT (22) command, the OUT (23) command, and the MOV (3,4) command are extracted from the user program memory 3, and they are stored in the RAM 3.

When an ILC command is detected in step 408 or an END command is detected in step 409, the flow of control advances to the step 412 and output processing on the display of the CRT 8A and printout on the printer 9 are performed.

Figure 6:
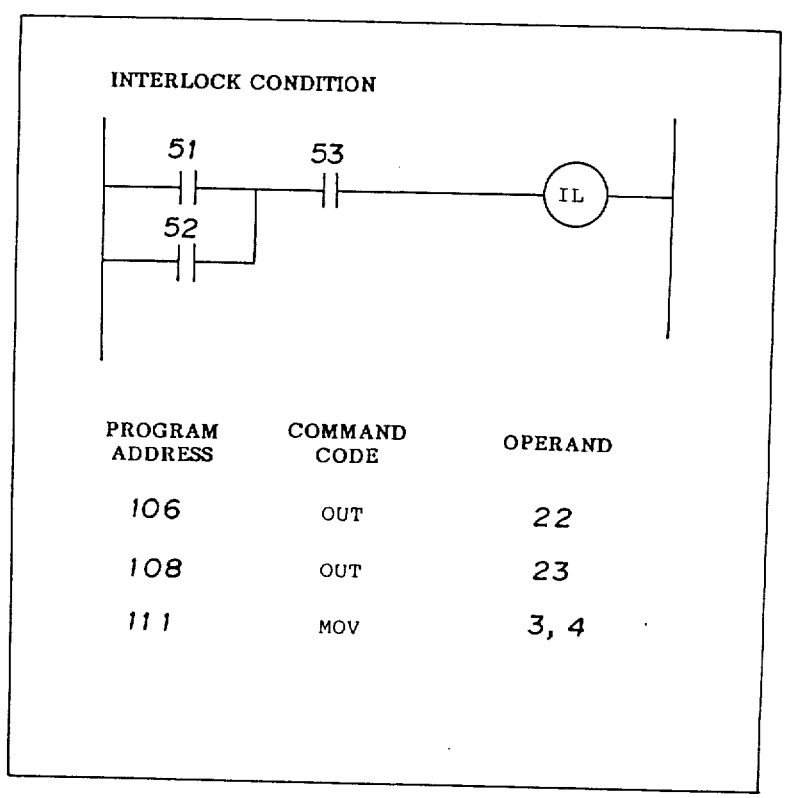
FIG. 6 shows the debug information which is outputted in the case of the first preferred embodiment whose flow chart is shown in FIG. 4.

Thus according to the output processing to be performed here, in the routine of step 405, a circuit including an IL command is formed in logical relationship with the various user commands stored in the RAM 5, in terms of the ladder diagram shown in FIG. 7(A) for instance, and in step 411 the OUT (22) command, the OUT (23) command, and the MOV (3,4) command are stored in the RAM 5 and are outputted to the CRT 8A and the printer 9 in relationship with the relevant program addresses. As a result, all the necessary information for debugging is outputted on the CRT 8A and the printer 9 in the format shown in FIG. 6.

In the routine of the step 410, all the OUT commands and the output corresponding existing between the IL command and the ILC command are all retrieved, but as an alternative it would be also possible to retrieve only the OUT commands alone or the output corresponding commands alone.

In this case, operating the IL key, the OUT key, and the CRS key in that order causes all the OUT commands to be retrieved. And operating the IL key, the MOV key, and the CRS key in that order causes only the MOV command to be retrieved.

In the routine of step 412, it further would be possible to have the print output to the printer 9 be produced only when the PRINT key is operated.

Figure 5:
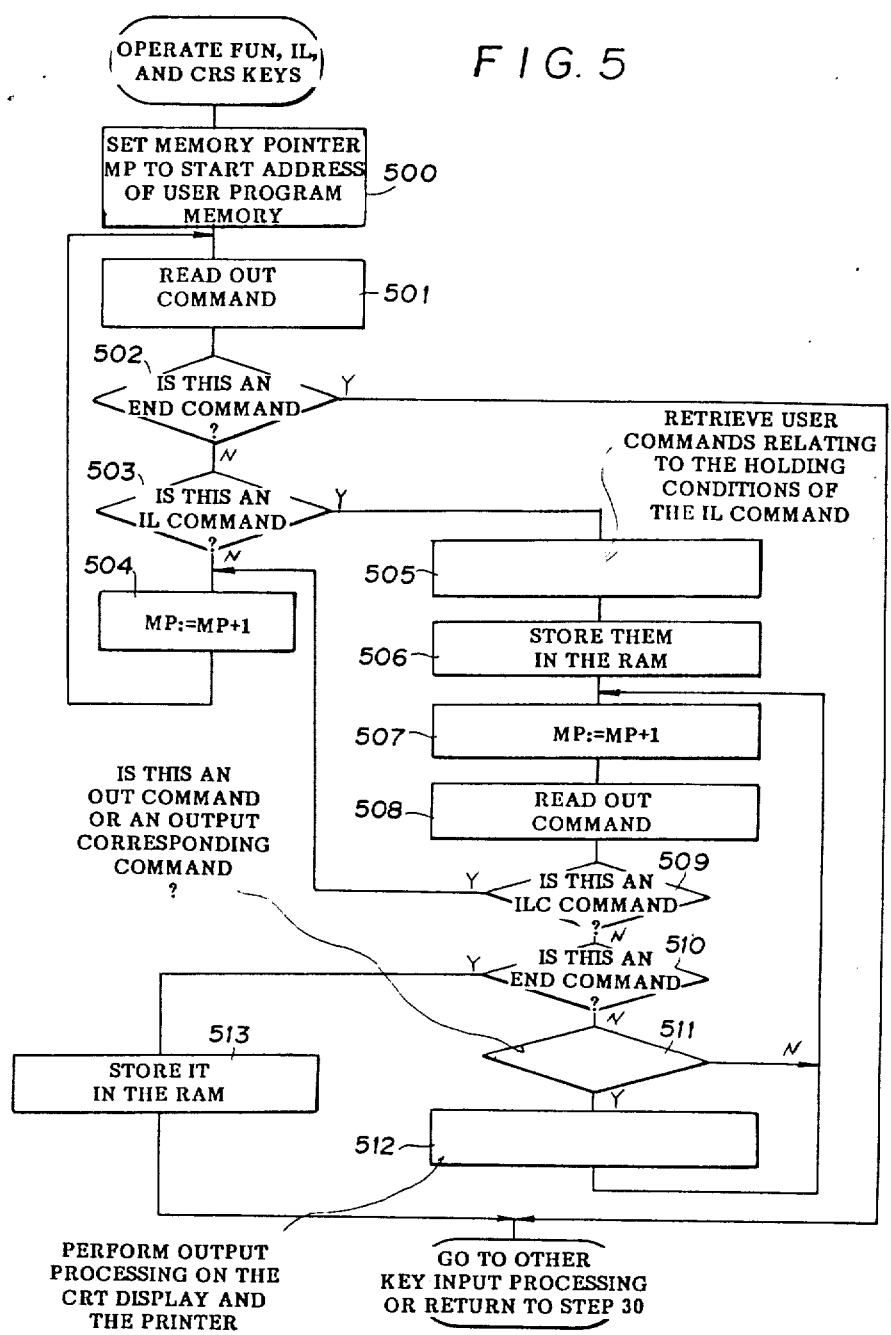
FIG. 5 is a flow chart showing another system service process incorporated in the operation of a second of the preferred embodiments of the present invention.

The above description relates to a processing episode concerning only one IL command, and the flow chart shown in FIG. 5 corresponds to the case which is similar to the one described previously except for the difference that a plurality of IL commands exist in the user program. This concept by itself constitutes the operation of the second preferred embodiment of the present invention.

In the figure, in the first step 500, the memory pointer MP is set up to be equal to the start address of the user program memory 3.

From step 501 to step 504, commands are read out from the user program memory 3 one by one as the memory pointer MP advances, thereby detecting IL command and END commands.

Upon detection of an END command (step 502), because this signifies the termination of the user program, the flow of control advances to another key input process, or to step 30.

Upon detection of an IL command (step 503), the processing of the steps 505 and 506 is performed. The processing in these steps 505 and 506 is similar to the processing in the steps 404 and 405.

Then, in the steps 507, 508, and 509, commands are read out from the user program memory 3 one by one as the memory pointer MP is advanced, and upon detection of an ILC command the flow of control advances to the step 501 by way of the step 504, thus to move on to a routine for reading out the next IL command.

If the read out command is not an ILC command and is not an END command, the flow of control advanced to the step 511 by way of the step 510.

In the step 511, it is determined whether the command read out in the step 508 is an OUT command or an output corresponding command (such as a MOV command, a CMP command, and so on). If the result of this determination is NO, then the flow of control advances to the step 507 to read out the next command. On the other hand, if the result of this determination is YES, the OUT command or the output corresponding command is stored in the RAM 5 (step 512), to move on to the step 507.

Thus, when an IL command is detected (step 503), the processing relating to this IL command is executed (steps 505 and 506), and all the OUT commands and the output corresponding commands located between this IL command and the corresponding ILC command are detected (steps 507 to 512), to be repeated until an END command is detected in the step 510.

When an END command is detected in the step 510, the flow of control advances to the step 513, and after performing output processing for the CRT 8A and the printer 9, as described above, the flow of control advances to other key input processes, or to the step 30.

In the routine of the step 511, it is also possible, as in the case of the step 410, to retrieve only the output commands, or alternatively only the output corresponding commands.

In the routine of the step 513, it is also possible to have the output to the printer 9 be produced only when the PRINT key is operated.

Although the user program has been described to be in the form of the ladder diagram shown in FIG. 7(A) in the above description, this invention is not to be considered as being limited by this, but also is applicable to user programs which may be described in the form of a flow chart, for example. And debug information is hereinabove shown as being outputted to the CRT display and the printer, but it is also possible that the debug information should be outputted only to the CRT display, or only to the printer.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claim, which follows.

What is claimed is:

1. A programmable controller, comprising:
    a programmable console comprising a keyboard having a special key;
    a user program memory;
    a retrieval means for retrieving the contents of said user program memory in response to the operation of said special key provided in said keyboard;
    a first command extracting means for extracting a series of user commands relating to whether execution conditions for an interlock command are met or not when the interlock command is detected by the action of said retrieval means;
    a first memory means for storing the interlock command and said series of user commands;
    a second command extracting means for, during the time between the detection of the interlock command and the detection of a corresponding interlock clear command by the action of said retrieval means, extracting all the specific user commands from the group of user commands interposed between the interlock command and the interlock clear command;
    a second memory means for storing the specific user commands with their addresses;
    means for outputting the interlock command and the series of the user commands stored in said first memory means; and
    an output processing means for outputting the specific user commands and their addresses stored in said second memory means.

* * * * *